United States Patent [19]

Morris et al.

[11] 3,933,337

[45] Jan. 20, 1976

[54] TIME-DELAYED AUTOMATIC SHUT-OFF MEANS FOR VALVES

[75] Inventors: Earl L. Morris; Theodore J. Sally, both of Whittier, Calif.

[73] Assignee: Acorn Engineering Company, Industry, Calif.

[22] Filed: June 7, 1974

[21] Appl. No.: 477,190

[52] U.S. Cl. .................................. 251/54; 188/317
[51] Int. Cl.² .................. F16K 21/06; F16K 21/16; F16K 31/48
[58] Field of Search ............ 251/48, 49, 50, 51, 52, 251/54, 55; 188/268, 282, 316, 317; 91/399; 92/8, 10

[56] References Cited
UNITED STATES PATENTS

| | | | |
|---|---|---|---|
| 95,054 | 9/1869 | Smith .................................. 251/52 |
| 793,698 | 7/1905 | Walter ................................ 251/54 |
| 2,181,581 | 11/1939 | Fraser ................................ 251/52 |
| 2,825,427 | 3/1958 | Steibel ............................. 188/282 |
| 3,342,448 | 9/1967 | Parkison .............................. 251/51 |
| 3,587,397 | 6/1971 | Hagopian ............................ 91/399 |
| 3,638,682 | 2/1972 | Heyer et al. ......................... 251/54 |
| 3,834,282 | 9/1974 | Kongelbeck ......................... 92/10 |
| 3,850,078 | 11/1974 | Polizzi ................................... 92/8 |

FOREIGN PATENTS OR APPLICATIONS 611,619  11/1948  United Kingdom................... 251/52

Primary Examiner—Irwin C. Cohen
Assistant Examiner—George L. Walton
Attorney, Agent, or Firm—Ben E. Lofstedt

[57] ABSTRACT

An adjustable dashpot mechanism for controlling the rate of return of a spring-biased axially-displaceable shaft, comprising: a tubular housing having portions of unequal diameters therein with rims thereabout a shaft slidably mounted within the housing and extending beyond the ends of the housing, a dashpot piston fixedly mounted to the shaft within the housing and having an adjustable orifice therethrough, a flexible flange disposed between the periphery of the dashpot piston and the housing for effecting fluid sealing engagement therebetween when the dashpot piston is moved away from the smaller diametered portion in the housing and for effecting nonfluid sealing engagement when the dashpot piston is moved towards the smaller diametered portion in the housing, a reservoir piston slidably mounted on the shaft within the housing between the larger diametered portion of the housing and the dashpot piston and a spring disposed between the housing and the reservoir piston for urging the reservoir piston towards the dashpot piston.

14 Claims, 8 Drawing Figures

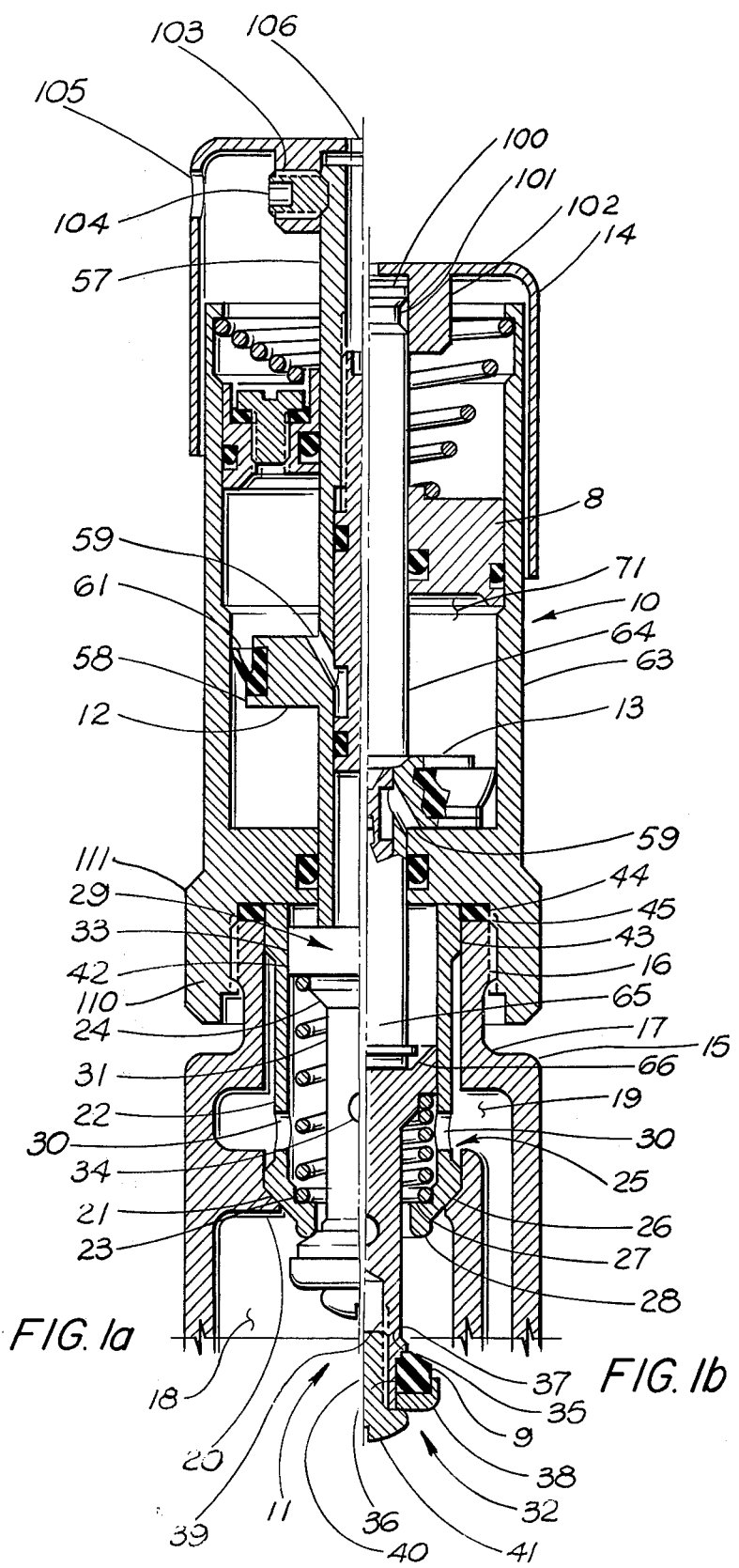

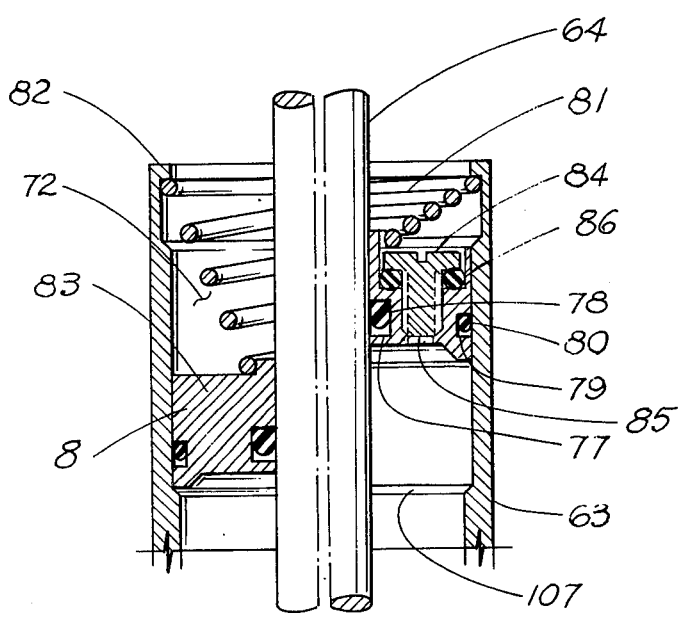
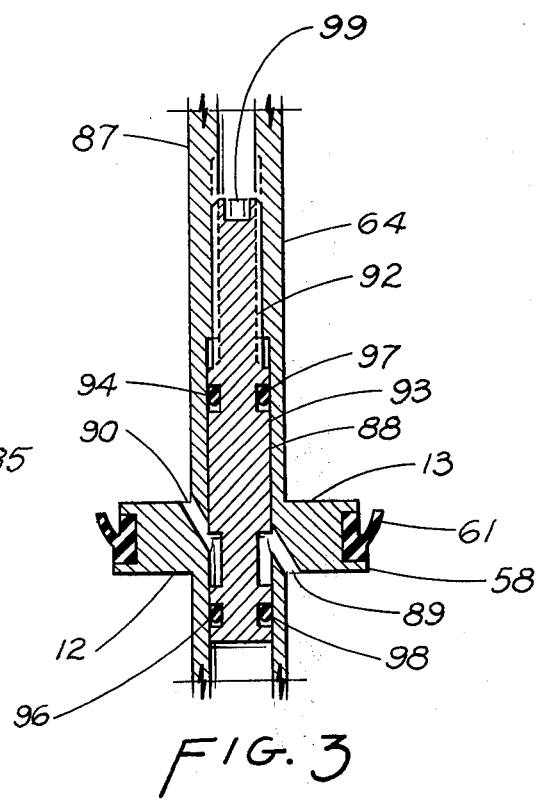
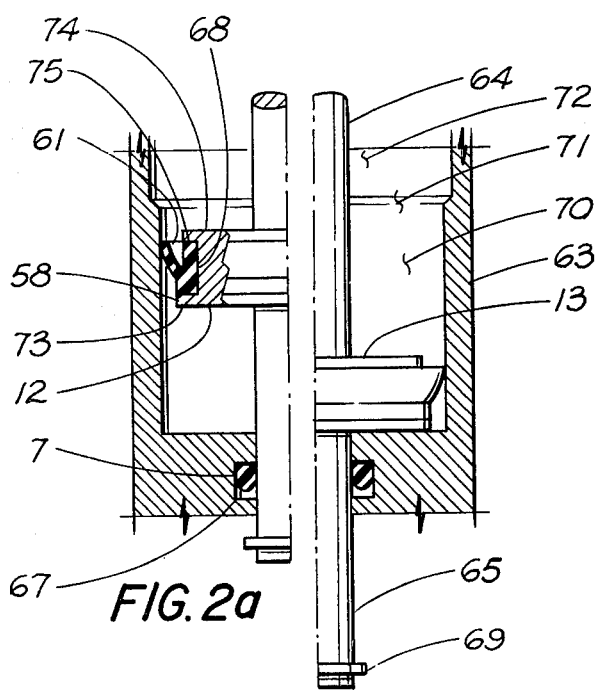
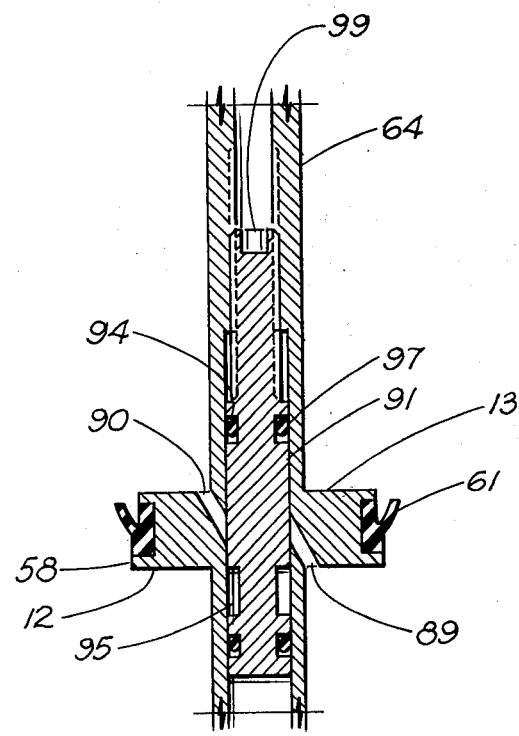

ance, is 3,933,337

TIME-DELAYED AUTOMATIC SHUT-OFF MEANS FOR VALVES

BACKGROUND OF THE INVENTION

1. Field of the Invention

This invention resides in the field of time-delayed, automatic shut-off means for valves.

2. Prior Art

Generally, automatic shut-off means for valves such as exemplified by U.S. Pat. Nos. 2,181,581 (Fraser); 2,710,736 (Miller) 3,065,948 (Nolan) and 3,342,448 (Parkison) have characterized the prior art in this area.

All of the aforementioned patents, incorporate a time-delay mechanism which utilizes, as the metered liquid, the same liquid as controlled by the valve whose time-delayed closing is regulated by the dashpot mechanism.

In most applications, this liquid will be water. Use of water as the dashpot metering liquid typically results in minerals being deposited in and about the passageway through which the liquid is metered.

At the very least, the mineral deposits will restrict the effective diameter of the liquid metering passageway thereby increasing the time delay. Eventually, the metering passageway becomes plugged rendering the dashpot mechanism inoperative.

To remedy this situation, some of the prior art devices utilized a movable pin which moved in and out of the metering passageway to clear it of the restricting mineral deposits.

However, even the use of a pin to create a so-called "self-cleaning orifice" is inadequate to effect a reliable dashpot device which uses the water from the water supply because within a very short period of time the mineralization will clog the liquid metering combination and thereby render it inoperative.

Further, the solid particles within the water will, if not filtered, be deposited within the dashpot chamber and either completely fill it, or at the very least, unduly limit the stroke of the dashpot piston. In either case, the time delay is significantly shortened or becomes effectively "zero."

In addition, the viscosity of water acts as a practical limit on the amount of time delay available in a dashpot device such as found in the aforementioned patents.

Utilizing a liquid for dashpot metering other than water in a water supply system obviously requires that the metering liquid be isolated from the water supply system. However, one of the problems encountered when using a liquid other than water as the dashpot liquid is that during the operation of the dashpot a small amount of the dashpot liquid is lost. Eventually, the dashpot liquid becomes exhausted to such an extent that the dashpot becomes inoperative.

Further, the liquid selected for use as the dashpot liquid must have a rather large heat capacity to preclude it from being converted into its gaseous phase when the dashpot mechanism is used with a hot water supply. Should this occur, the dashpot time-delay would be reduced and/or the fluid seals may be unable to adequately contain the metering fluid in its gaseous phase.

SUMMARY OF THE INVENTION AND OBJECTS

An adjustable dashpot mechanism is disclosed which is particularly useful for controlling the rate of return of a spring-loaded, axially-displaceable stem for a liquid-control valve. The dashpot mechanism is conveniently assembled in the form of a cartridge-like assembly and is removably attachable to the liquid-control valve housing. When so attached, the stem of the dashpot mechanism is placed in abutment with the axially-displaceable valve stem.

Fundamentally, the dashpot mechanism comprises a housing, a dashpot piston with a flexible flange thereabout and fixedly mounted on a hollow stem, and arranged to conformably mate with the inside of the housing wall, a passageway with a variable crossectional area which places the inside of the hollow stem in fluid communication with both piston faces and a spring-biased reservoir piston slidably mounted on the stem and disposed above the dashpot piston in fluid-sealing engagement with the inside of the housing wall.

Prior to operation of the dashpot, the cartridge housing is removably secured to the valve housing in order to place the end of the hollow stem in abutting engagement with the stem of the axially-displaceable valve and then the dashpot and reservoir chambers are filled with timing liquid via a threaded aperture in the reservoir piston. The valve is typically maintained in its closed position by a compression spring disposed about the valve stem.

When the opposite end of the dashpot piston-stem is depressed, the timing liquid in the dashpot chamber is forced around the flexible flange and piston into the dashpot chamber located between the reservoir piston and the dashpot piston. A small amount of the timing liquid will pass through the passageway through the piston, but this amount is insignificant compared to the amount of liquid which flows past the flexible flange.

The spring-biased, floating reservoir piston is then directed into engagement with the surface of the timing liquid ensuring that the relatively incompressible timing liquid is captured in an enclosure having a fixed volume.

Since the valve spring is compressed when the valve is opened, the valve stem exerts a force on the piston stem directing the piston towards the reservoir piston. When this occurs, the flexible peripheral flange expands outwardly and forms an annular, U-shaped cup which prevents the timing liquid from flowing thereabout by creating a fluid seal between the rigid piston body and the inner wall of the dashpot housing. Consequently, the timing liquid is directed into the passageway through the piston and stem body. By metering this liquid through the passageway, the rate at which the piston stem returns into the dashpot housing is delayed. The rate of delay is controlled by the rate of timing liquid flow through the passageway. The rate of timing liquid flow is, of course, in turn, controlled by the effective liquid flow area which is a function of the cross-sectional area of the passageway.

When the valve stem is depressed to open the valve, the fluid seal which isolates the timing liquid from the valve-controlled liquid, typically water, wipes the timing liquid from the stem. However, since a small amount of the timing liquid remains as a residue on the stem body as it extends out of the cartridge body, a small amount of timing fluid is lost during each cycle. Consequently, to extend the operational life of the dashpot time-delay function, a supplemental supply of timing liquid is contained in a reservoir within the housing to automatically replenish the supply of dashpot timing liquid as it is lost.

This invention is particularly useful when combined with water faucets to create a time-delayed, automatic-closing faucet for use in public facilities and institutions.

An object of the invention is to provide a new and improved self-closing faucet arranged so that the time-delayed closing action of the valve is repetitive at a constant rate irrespective of variations in water supply or inlet pressures.

A further object of the present invention is to provide a novel automatically-closing faucet having a dashpot timing device removably connectable to a valve via a split stem.

Another object of the invention is to provide a combination time-delayed closing unit and valve wherein the piston is arranged to retard the closing movement of the valve while allowing rapid opening movement when the valve stem is manually displaced in an axial fashion to open the valve.

The various features of novelty which characterize our invention are pointed out with particularity in the claims annexed to and forming a part of the specification. However, in order to obtain a more complete understanding of the present invention, along with its attendant advantages and features, and specific objects obtained through its use, reference should be had to the accompanying drawings and detailed description of the preferred embodiment hereinafterwards described and illustrated.

The accompanying drawings illustrate a preferred embodiment of the invention, in which:

BRIEF DESCRIPTION OF THE DRAWINGS

FIG. 1 is a split-elevational view of the present invention, shown partially in section, the left side depicting said invention in its closed position and the right half depicting said invention in an open or fully extended position.

FIG. 2 is a partial elevational section of the stem-mounted, dashpot piston element of the present invention the left side depicting the dashpot piston in its substantially unactuated postion and the right side depicting the dashpot piston following the actuation thereof at the start of the time-delay cycle.

FIG. 3 is an elevational section of the stem and piston member of the present invention with the variable liquid metering passageway illustrated in its open position.

FIG. 4 is similar to FIG. 3 with the liquid metering passageway depicted in its closed position.

FIG. 5 is a partial elevational section of the spring-biased, reservoir piston mounted on the stem of the dashpot stem and piston member of the present invention the left side depicting the location of the reservoir piston when the reservoir is substantially filled with timing liquid and the right side depicting the location of the reservoir piston when the reservoir is substantially depleted of timing liquid.

Before explaining the instant invention in detail, it is to be understood that the invention is not limited by way of its application to the details of construction and arrangement of parts as illustrated in the accompanying drawings. This is so because the invention is capable of other embodiments and of being practiced in various ways. It should also be clearly understood that the phraseology or terminology utilized herein is primarily directed towards the purpose of description and should not be considered as a limitation thereon.

DESCRIPTION OF THE PREFERRED EMBODIMENT

Referring now to FIG. 1 of the drawings, the present invention referred to and indicated generally at 10, comprises, in general, a housing 63, a dashpot piston 58 with a flexible flange or an annular check valve and fluid-sealing member 61 thereabout and fixedly mounted on a hollow stem 57, an adjustable, liquid metering passageway 59 for effecting fluid communication between the oppositely-disposed piston faces 12, 13 and a spring-biased reservoir piston 8 slidably mounted to the stem 57 and disposed above the piston 58, and a push button member 14 secured to the stem 57 to permit manual actuation of the instant invention.

As clearly shown in FIG. 1, the present invention 10 is shown in its assembled form and is threadably secured to a water supply pipe 15 about the threaded section 16 of the necked-down, upstanding section 17 of the water pipe 15. Immediately below the upstanding section 17, the water pipe 15 is increased in diameter to form an enlarged chamber area which is divided into a water inlet chamber 18 and a water outlet chamber 19 by an internal annular shoulder 20. The face of the shoulder 20 facing the water outlet chamber 19 is countersunk to form a beveled seating surface 21.

Turning now to the valve cartridge 11, said cartridge 11 comprises a generally cylindrically-shaped body 22, and a spring 23 and a poppet valve member 24. The outside diameter of the body 22 is smaller than the inside diameter of the upstanding section 17 of the water pipe 15 and is adapted to be slidably inserted thereinto in substantial fluid-sealing relationship therewith. The inside of the body 22 is generally characterized throughout a major portion of its length by a relatively smooth bore having a constant cross section. However, adjacent to the bottom end 25 of the body 22, the body 22 is abruptly tapered, in an inwardly-directed fashion, to form a beveled surface 26 for fluid sealing engagement with the seating surface 21 of the shoulder 20. The surface at the bottom end 25 inside the body 22 is spotfaced to form an annular shoulder 27. The rim forming the bottom end 25 of the body 22 is radiused and extends beyond and beneath the seating surface 21 to form a valve seat 28.

The coil spring 23 has a diameter which is smaller than the inside diameter of the body 22 so as to be coaxially installable therein. When placed inside the body 22, the bottom end of the spring 23 rests on the shoulder 27 which serves as a stop for one end of the spring 23.

Intermediate the top end 29 and the bottom end 25 of the valve cartridge body 22, two oppositely-disposed apertures 30 are drilled through the wall of said body 22. These apertures 30 allow continuous fluid communication between the water outlet chamber 19 and the inside of the valve cartridge body 22.

The poppet valve member 24 comprises a stem 31, a valve head, generally indicated at 32 and centrally disposed at the bottom end of said stem 31 and a flange member 33 centrally disposed at the top of the stem 31. Intermediate the top and bottom ends the stem 31, a hole 34 is drilled transversely through the longitudinal axis of the stem 31. A rod (not shown) is aligned with holes 30, 34 and passed therethrough to lock the valve in its open position to permit the removal and replacement of the ring 9.

The valve head 32, in turn, is formed by an elastomeric ring 9 with an annular, beveled valve face 35 about the edge of one of its radially-extending faces, said ring 9 slidably mated over the undercut section 36 of the stem 31 with the beveled face 35 facing the top end of the stem 31. In addition, the beveled face 35 side of the ring 9 is abutted against the outwardly-extending, stepped radial wall 37. This wall 37 serves to support one end of the valve face 35 in order to prevent the ring 34 from being stretched and thereafter rolled over. Without wall 37, this typically occurs when the valve face 35 is engaged and disengaged with the valve seat 28. When it rolls over, the valve face 35 will not seat properly with the valve seat 28 and will typically leak.

The bottom of the ring 9 is nested in an annular, U-shaped cup 38 which is mounted on the end of stem 31 about the undercut section 36. The cup 38 provides support for the elastomeric ring 9 so as to allow the ring 9 to achieve proper seating with the valve seat 28. The end of the stem 31 is bored and threaded to form a receptacle 39 for a threaded fastener. A threaded fastener 40, having a crown portion 41 larger in diameter than the aperture of the annular cup 38, is threadably mated with the receptacle 39 to prevent the cup 38 from sliding off the undercut section 36.

The annular flange member 33 has a diameter which is slightly smaller than the inside diameter of the valve cartridge body 22. This allows the flange member 33 to be slidably mated with the relatively smooth bore of the body 22. The function and purpose of the flange member 33 is fully developed as the present invention is further described hereinafterwards.

The valve cartridge 11 is easily assembled in the following manner. The spring 23 is inserted, bottom end first, into the body 22 and rests on the shoulder 27. The stem 31 of the poppet valve member 24, without the valve head 32, is inserted into the body 22 undercut section 36 first. At the same time, the top end of the spring 23 engages the underside of the flange member 33 and serves as a stop therefor. The ring 29 is now fitted over the end of the stem 31 about the undercut section 36. The U shaped annular cup 38 is then slidably mated with the undercut section 36 of the stem 31 and placed in intimate abutment with the elastomeric ring 28. Following this, the threaded fastener 40 is threadably mated with the receptacle 39 thereby securing the valve head assembly in fixed relationship to the stem 31.

It should be noted at this time that in the assembled configuration, the flange member 33 serves to function in a number of necessary roles. First of all, it serves as a surface against which an axial force can be applied to overcome the bias force of the spring 23, thereby allowing the valve head 32 to move away from the valve seat 28. Secondly, the sidewall 42 of the flanged surface 33 is sufficiently deep to prevent deviation of the stem 31 from the longitudinal axis of the valve cartridge body 22 especially during actuation thereof. Such a deviation is oftentimes referred to as "cocking." The desired flange thickness necessary to prevent cocking may be calculated by using the well-known mathematical formula for non-cocking; namely, that the effective length of the guided vertical distance when divided by the diameter of the flange 33 should be at least unity or one. In this case, the effective length of the guided vertical distance is equal to the thickness or depth 42 of the flange member 33. Consequently, the flange member 33 serves to guide the stem, and, therefore, the valve head 32, so as to ensure that the valve head 32 is engaged and disengaged with the valve seat 28 in a poppet valve fashion. Thirdly, the diameter of the flange member 33 is sufficiently small with respect to the bore diameter of the body 22 to permit fluid, such as water, to pass freely therebetween.

Once the valve cartridge 11 is assembled, it is installed into the upstanding section 17 of the water pipe 15, bottom end 25 first, and seated in fluid sealing relationship with the seating surface 21 of the shoulder 20. When seated, the apertures 30 are located within the water outlet chamber 19 allowing fluid communication between the inside of the body 22 and the chamber 19. Further, when the cartridge body 22 is seated, the top end 43 of the body 22 projects beyond the top of the upstanding water pipe section 17.

A fluid-sealing gasket 44 is slidably mated over the top end 43 of the body 22 and thereafter seated against the rim 45 of the upstanding water pipe section 17.

The housing 63 is threadably secured to the upstanding section 17 of the water pipe 15 about a threaded section 16 of a cylindrical skirt 110 with a wrench-gripping surface 11 thereabout and depending from the housing 63 so as to securely fix and seat the valve cartridge body 22 against the seating surface 21 within the water pipe 15 and to simultaneously effect a fluid seal between the gasket 44 and the housing 63. When this is accomplished, the end 65 of the stem 64 is disposed in juxtaposition to the spotface 66 of the top end 29 of the poppet valve member 24. The spotface 66 locates the stem 64 in axial alignment with the poppet valve member 24.

Referring now also to FIG. 2, an annular fluid sealing member 67 is disposed in a groove 7 in the housing 63 to prevent leakage of liquid from the housing 63. A snap-ring 69 about the end 65 of the stem 64 serves to prevent the stem 64 from being disengaged from the housing 63 and to limit the travel of the piston member 58.

The chamber 71 within the housing 63 is functionally separated into two chambers; namely, a dashpot chamber 70 and a reservoir chamber 72. The dashpot chamber 70 houses a dashpot piston member 58 which is typically formed as an integral part of the stem 64 and positioned intermediate the ends thereof. A groove 68 about the outer edge of the piston 58 serves as a receptacle for the flexible flange 61 which is disposed in conformal relationship to the inside wall of the housing 63 which functions as an annular check valve and fluid sealing member 61 during the operation of the invention.

The flexible flange 61 is typically fabricated from an elastomeric material, such as rubber, neoprene, plastic or the like. The annular flange 61 has a generally V shaped cross section. The inside leg 75 of the flange 61 is constructed for intimate abutment with the bottom of the groove 7, and is formed so that the bottom of the leg 75 extends to the outer edge of the lower groove wall 73.

By radially projecting the lower groove wall 73 beyond the upper groove wall 74 and by positioning the notch of the V in the flange 61 above the lower groove wall 73 and within the radius thereof, greater operational stability and control of the flexible flange 61 is achieved.

Turning now to FIG. 5, the reservoir chamber 72 area is detailed, and contains a second piston member 8 which is slidably mounted onto the upper portion of the stem 64. A groove 77 about the inner opening of the second piston member 8 serves as a seat for a fluid sealing member 78; typically an elastomeric O-ring seal. Thus, a fluid seal is effected between the inner opening of the second piston member 8 and the stem 64. A second groove 79 about the periphery of the piston 8 serves as a receptacle for a second fluid sealing member 80 to create a fluid seal between the housing 63 in the reservoir chamber 72 and the second piston member 8.

A helically-wound spring 81 is installed between the inwardly-projecting flange 82 rimming the upper portion of the housing 63 and the upper piston face 83. A threaded passageway 85 bored through the body of the second piston member 8 permits, when desired, fluid communication between the areas divided by the second piston member 8. A screw 84 and an annular fluid-sealing gasket 86 are used to plug the passageway 85 when desired. The purpose and need for the passageway 85 and the screw 84 will become apparent as the description of the present invention continues.

With continued reference now to FIGS. 3 and 4, it may be seen that the stem 64 is tubular in nature. The upper portion 87 of the stem 64 is threaded. The balance of the tubular stem 64 has a smooth surface 88. A passageway 89 is bored from the junction of the piston face 12 into the hollow stem 64. Another passageway 90 is bored from the junction of the piston face 13 into the hollow stem 64. Together with the hollow portion of the stem 64, passageways 89,90 form a passageway 59 the function of which will become more apparent as the description of the instant invention proceeds.

A solid, rod-like body 91 having an upper, threaded section 92 and a lower, smooth-surfaced section 93 with three annular grooves 94, 95 and 96 thereabout, whose function will be described hereinafterwards, is threadably mated with the threaded, upper portion 87 of the stem 64. The lower, smooth-surface section 93 is slidably and peripherally mated with the smooth surface 88 of the stem 64.

Annular, O-ring type, fluid seals 97 and 98 are seated in the grooves 94 and 96 respectively, and effect a fluid sealing relationship between the lower section 93 and the smooth surface 88 of the stem 64.

It should be noted at this time that the degree of threaded engagement between the threaded section 87 of the stem 64 and the threaded section 92 of the body 91 may be adjusted via the recessed portion 99 in the top of the body 91. Typically, the recessed portion 99 will be hex-shaped in order to accept an Allen wrench. The degree of threaded engagement will, of course, provide the necessary means by which the body 91 may be effectively reciprocated within the stem 64, to vary the degree of alignment between the groove 95 and the passageways 89,90, the purpose of which is hereinafterwards described.

Returning once again to FIG. 1, it may be seen that a cup-shaped cap 14 having a boss 102 slidably engaged with the top end of the stem 64 and a threaded aperture 103 in the wall of the boss 102 is fixedly secured to the top end 100 of the stem 64 via the annular groove 101 in the stem 64, by means of a set-screw 104 which is threadably engaged with the threaded aperture 103 and projects therebeyond into the groove 101 of the stem 64. The cap 14 functions as a push button member 14 to effect axial displacement of the stem 64 when desired. Apertures 105, 106 in the push button member 14 serve to respectively provide access to the set screw 104 and the recessed portion 99 of the body 91 to permit either the removal or adjustment thereof.

Prior to operation of the subject invention, the screw 84 is removed from the threaded passageway 85 of the piston 8. The timing liquid, typically liquid silicon, such as A Dimethylpolysiloxane, is injected into the housing chamber disposed between the two pistons 58, 8 until this chamber is completely filled with liquid. The stem 64 is then axially-displaced to cycle the piston 58 throughout its entire stroke in order to ensure that both the reservoir chamber 72 and the dashpot chamber 70 are completely filled with the timing liquid. However, when a syringe is used to inject the timing fluid into the chambers 70 and 72, the syringe needle is slipped between flange 61 and the wall of the housing 63 to first fill the dashpot chamber 70 and afterwards the needle is withdrawn into the reservoir chamber 72 to fill the reservoir chamber 72. Filling in this manner does not require any cycling or movement of the dashpot piston 58 and its stem 31. Once this is done, the screw 84 is replaced to plug the passageway 85. With continued reference to the drawings it may be seen that the operation of the present embodiment of the subject invention is effectuated by manually depressing the push button member 14. As is clearly shown in FIG. 1, the left side depicts the present invention coupled to a poppet valve; both of which are shown in a closed position. The right side illustrates the present invention coupled to a poppet valve; both of which are shown in an open position. The depression of the push button member 14 produces an inward displacement of the stem 64 which, in turn, contacts the top end 29 of the poppet valve member 24 and produces a corresponding inward displacement of the poppet valve member 24 thereby unseating the beveled valve face 35 of the valve head 32 from the valve seat 28.

When the valve face 35 is unseated, water flows from the water inlet chamber 18 into the water outlet chamber 19 via the unseated valve head 35 and the valve seat 28. This unseated condition is illustrated by the right-hand side, in vertical section, of FIG. 1.

As the valve face 35 is unseated, the silicon timing liquid in the chamber 71 of the housing 63, as a result of the piston movement of the dashpot piston member 58, the timing liquid forces the peripheral lip of the flange 61 towards the leg 75 thereby permitting the liquid to flow relatively unrestrictedly into the housing chamber between the dashpot piston member 58 and the second piston member 8. Additionally, an insignificant amount of the timing liquid enters the passageway 89 and flows into the tubular stem 64 about the groove 95 in the body 91 and out of the passageway 90 into the housing chamber between the piston member 58 and the second piston member 8.

When the face 12 of the dashpot piston member 58 contacts the housing 63 adjacently-disposed about the groove 68, the push button member 14 is released. Since the spring 23 about the poppet valve member 24 is compressed as clearly shown in the right-hand side of FIG. 1, a bias is applied to the stem 64 tending to direct the dashpot piston member 58 towards the second piston member 8. As the dashpot piston member 58 begins to move in this direction, the silicon timing liquid forces the periphal lip of the flange 61 outwardly and into fluid sealing engagement with the housing 63. As a result, the timing liquid cannot flow from the housing chamber disposed between the dashpot piston member 58 and the second piston member 8 via the flange 61 into the housing chamber located between the dashpot piston member 58 and the housing 63 adjacently-disposed about the groove 68. Consequently, the timing liquid is forced to flow thereinto via the metering passageway 59. The liquid metering passageway 59 comprises passageway 90, the passageway formed between the tubular stem 64 and the annular groove 95 and passageway 89, as shown in FIG. 3. Annular, O-ring-type fluid seals 97 and 98, which are seated in grooves 94 and 96 respectively, act to contain the timing liquid within the liquid metering passageway 59.

The rate at which the dashpot piston member 58 travels toward the second piston member 8 is determined by the rate at which the timing liquid flows through the metering passageway 59. The timing liquid flow rate through the liquid metering passageway 59 is primarily determined by the cross-sectional area of the metering passageway 59. In this particular embodiment of the present invention, the cross-sectional area is determined by the degree of alignment between the two passageways 89 and 90 and the annular groove 95 in the body 91. Due to this particular function, the body 91 is generally referred to as a timing screw.

As illustrated in FIG. 4, the timing screw 91 may be adjusted to completely block the flow of timing liquid through the liquid metering passageway 59.

Adjustment of the timing screw 91 is typically accomplished by the use of an Allen wrench adapted to be received into the recessed portion 99 in the top of the timing screw 91.

Concurrently with the movement of the dashpot piston member 58, the silicon timing liquid disposed in the housing chamber between the dashpot piston member 58 and the second piston member 8 is maintained in full liquid contact with the metering passageway 59 by the second piston member 8 which is biased towards the dashpot piston member 58 by means of the spring 81. Consequently, the chamber 72 acts as liquid reservoir for the dashpot chamber 70, serving to replenish the timing liquid which is lost as the lower portion 65 of the stem 64 is wiped by the annular fluid seal 67 as it exists the housing 63 when the push button member 14 is depressed. Following the wiping of the stem 64 by the seal 67, a residue is left on the lower portion 65 of the stem 64 which represents a small loss of silicon timing liquid. Therefore, to prolong the operational life of the present invention, a reservoir chamber is required to insure that an additional amount of silicon liquid timing fluid is provided.

The reservoir chamber area 72 is characterized, in this particular embodiment of the present invention, by its slightly larger bore in the housing 63 as compared to the bore of the dashpot chamber area 70. Since the reservoir piston member 8 is peripherally engaged with the walls about the bore of the reservoir chamber area 72, the stepped annular section 107 serves as a stop to prevent the reservoir piston member 8 from traveling therebeyond and into the dashpot chamber area 70. Absent such a stop, the operation of the dashpot piston member 58 might be limited or impaired. Further, by limiting the travel of the reservoir piston member 8, the spring 81 is always maintained in compression even when the reservoir piston member 8 is stopped against the stepped annular section 107 as illustrated in the right-hand section of FIG. 5, thereby continously providing a positive spring bias force to the reservoir piston member 8 to insure full contact with the timing liquid in the reservoir chamber area 72.

When the reservoir piston member 8 is at the opposite extreme of its travel within the reservoir chamber area 72, as shown in the left-hand section of FIG. 5, the helically-wound spring 81 is near fully compressed and acts as a stop to prevent the reservoir piston member 8 from traveling therebeyond.

While the instant invention has been described with reference to a particular embodiment thereof, it will be readily understood that variations and modifications thereof may be made without departing from the spirit or scope of the instant invention.

We claim:
1. A liquid-filled, dashpot mechanism, comprising:
 a. a dashpot housing having a dashpot chamber and a reservoir chamber wherein said liquid is disposed, said dashpot housing having portions of unequal diameters therein with rims thereabout;
 b. a stem means interposed in said dashpot housing and a portion of said stem means being disposed within said smaller diametered portion in contiguous relationship to said rim of said smaller diametered portion and slidably operable therein and projecting therebeyond;
 c. means for effecting a fluid sealing relationship between said rim of said smaller diametered portion and stem means;
 d. a dashpot piston means smaller in diameter than said larger diametered portion and fixedly disposed on said stem means, said dashpot piston means being operably disposed within said dashpot housing and capping said dashpot chamber formed between said smaller diametered portion in said dashpot housing and said dashpot piston;
 e. flexible flange means disposed about and inbetween said dashpot piston and said dashpot housing, said flexible flange means effecting fluid sealing engagement between said dashpot housing and said dashpot piston means when said dashpot piston means is moved away from said smaller diametered portion and effecting non-fluid sealing engagement when said dashpot piston means is moved towards said smaller diametered portion, thereby functioning as a check valve;
 f. a reservoir piston means slidably mounted on said stem means between said larger diametered portion and said dashpot piston means and disposed in peripheral, slidable engagement with said dashpot housing, said reservoir piston capping said reservoir chamber formed in said dashpot housing between said dashpot piston and said reservoir piston disposed within said dashpot housing;
 g. means for effecting fluid sealing relationship between said reservoir piston means and said stem means;
 h. means for effecting a fluid sealing relationship between said reservoir piston means and said dashpot housing;
 i. spring biasing means disposed between said reservoir piston means and said dashpot housing adjacent to said larger diametered portion in said dashpot housing for urging said reservoir piston means towards said dashpot piston means thereby maintaining said reservoir piston in full contact with said liquid in said reservoir chamber; and
 j. a liquid metering passageway through said dashpot piston providing fluid communication between said dashpot chamber and said reservoir chamber, whereby when said dashpot piston is moved towards said smaller diametered portion in said dashpot housing by urging said stem means to move within said smaller diametered portion of said dashpot housing and outwardly therefrom, the liquid in said dashpot chamber is forced through said liquid metering passageway and simultaneously flexes said flexible flange means away from said dashpot housing thereby creating non-fluid sealing engagement between said dashpot piston and said dashpot housing and when said dashpot piston is moved away from said smaller diametered portion in said dashpot housing by urging said stem means to move inwardly into said dashpot housing through said smaller diametered portion in said dashpot housing, the liquid in said reservoir chamber flexes said flexible flange means towards said dashpot housing and into fluid selaing engagement therewith and is forced to pass solely through said liquid metering passageway from said reservoir chamber to said dashpot chamber thereby effecting time-delayed movement of said stem means.

2. The mechanism of claim 1, further comprising:
a. a valve having a stem for control thereof; and
b. means for operatively associating said stem means with said stem of said valve.

3. The mechanism of claim 2, further comprising:
a. a housing for said valve;
b. means for removably securing said dashpot housing to said valve housing; and
c. biasing means for urging said stem means into said dashpot housing.

4. The mechanism of claim 3, wherein said means for removably securing said dashpot housing to a valve housing comprises:
a. a cylindrical skirt depending from said dashpot housing about said stem means projecting from said smaller diametered portion in said dashpot housing, said skirt having a wrench-gripping surface about the outside surface thereof and a threaded surface about the inside surface thereof; and
b. means for threadably securing said threaded skirt to said valve housing.

5. The mechanism of claim 1, further comprising removable stop means for preventing the disengagement of said reservoir piston means from said dashpot housing following the installation of said reservoir piston means and said spring biasing means in said dashpot housing.

6. The mechanism of claim 1, further comprising means for preventing said dashpot piston means from contacting said reservoir piston means within said dashpot housing.

7. The mechanism of claim 1, further comprising means for preventing the withdrawal of said stem means from said smaller diametered portion in said dashpot housing.

8. The mechanism of claim 1, further comprising means for limiting the stroke of said dashpot piston means within said dashpot housing.

9. The mechanism of claim 1, further comprising:
a. pushbutton means for permitting manual engagement of said stem means for axially displacing said stem means, said pushbutton means being formed as a cup and disposed about said larger diametered portion in said dashpot housing; and
b. means for removably securing said pushbutton means to said stem means.

10. The mechanism of claim 1, wherein said stem means is tubular and has a threaded section and a smooth bore section therein.

11. The mechanism of claim 10, wherein said liquid metering passageway for metering said liquid is adjustable in crossectional area so that the liquid metering rate may be varied.

12. The mechanism of claim 11, wherein said adjustable liquid metering passageway for metering said liquid comprises:
a. a rod having two ends and a threaded section about one of said ends for threadable engagement with said threaded section of said stem and a smooth section for slidable, contiguous engagement with said smooth bore section of said stem, said rod further having an annular groove about said smooth section of said rod;
b. a first fluid sealing means disposed between said other end of said rod and said groove in said rod to prevent fluid from passing between said rod and said stem beyond said first fluid sealing means;
c. a second fluid sealing means disposed between said threaded section of said rod and said groove in said rod to prevent fluid from passing between said rod and said stem beyond said second fluid sealing means;
d. means in said end of said rod adjacent said threaded section of said rod for receiving a tool for rotating said rod about its longitudinal axis whereby the threaded engagement between said rod and said stem may be adjusted; and
e. passageway means for placing said reservoir chamber in said dashpot housing in fluid communication with said dashpot chamber, said passageway means passing through said hollow stem in such a fashion that when said groove in said rod is aligned with said passageway means that fluid communication is established between said chambers and when said rod is not aligned with said passageway means fluid communication is not established between said chambers.

13. The mechanism of claim 1, wherein said reservoir piston means has a passageway therethrough to provide fluid communication between said reservoir chamber and the exterior of said dashpot housing.

14. The mechanism of claim 13, further comprising removable plug means for installation into said passageway in said reservoir piston to prevent the flow of fluid through said passageway in said reservoir piston means.

* * * * *